United States Patent [19]
Lowe et al.

[11] Patent Number: 5,912,875
[45] Date of Patent: Jun. 15, 1999

[54] APPLICATOR FOR PROTECTIVE COVER FOR AN OPTICAL DISC

[75] Inventors: Micheal D. Lowe; Tom A. Borhot; Pijo Andric; Oliver J. Medic; Warren J. Blatz; Douglas Christian Greening; Stephen Arthur Withington, all of Calgary, Canada

[73] Assignee: Digital Armor Inc., Calgary, Canada

[21] Appl. No.: 08/987,671

[22] Filed: Dec. 9, 1997

Related U.S. Application Data

[63] Continuation-in-part of application No. 08/713,523, Sep. 13, 1996, Pat. No. 5,787,069.

[51] Int. Cl.⁶ .............................. G11B 7/24; G11B 33/14
[52] U.S. Cl. ........................................... 369/291; 369/289
[58] Field of Search .................... 369/275.5, 283, 369/284, 289, 290, 291, 292; 29/229, 235, 243.5, 243.517, 243.518, 270, 271; 428/42.1, 66.6, 80, 908.8

[56] References Cited

U.S. PATENT DOCUMENTS

| | | | |
|---|---|---|---|
| 3,961,656 | 6/1976 | Aggarwal | 369/291 |
| 4,327,830 | 5/1982 | Patel et al. | 369/292 |
| 4,482,903 | 11/1984 | Affolter | 346/137 |
| 4,556,968 | 12/1985 | Pelkey et al. | 369/284 |
| 4,561,086 | 12/1985 | Geyer | 369/291 |
| 4,793,480 | 12/1988 | Gelardi et al. | 369/291 |
| 4,879,710 | 11/1989 | Iijima | 369/291 |
| 4,983,437 | 1/1991 | Merrick | 428/40 |
| 5,020,048 | 5/1991 | Arai et al. | 369/291 |
| 5,299,186 | 3/1994 | Tsurushima | 369/291 |

FOREIGN PATENT DOCUMENTS

| | | | |
|---|---|---|---|
| 1193364 | 9/1985 | Canada | 369/291 |
| 599655 | 6/1994 | European Pat. Off. | 369/291 |
| 3427381 | 1/1986 | Germany | 369/290 |
| 8900365 | 9/1990 | Netherlands | 369/291 |
| 711407 | 6/1954 | United Kingdom | 369/291 |
| 2217507 | 10/1989 | United Kingdom | 369/291 |
| 2279799 | 1/1995 | United Kingdom | 369/291 |
| 9206904 | 4/1992 | WIPO | 369/291 |
| 9414161 | 6/1994 | WIPO | 369/291 |
| 96/21928 | 7/1996 | WIPO | 369/291 |

*Primary Examiner*—David L. Ometz
*Attorney, Agent, or Firm*—Kane, Dalsimer, Sullivan, Kurucz, Levy, Eisele and Richard, LLP

[57] ABSTRACT

There is provided a new and useful apparatus for applying a removable protective cover to an optical disc in which the optical disc has a circular configuration, an aperture centered therein and an outer edge. The cover comprises at least one sheet of film of generally circular configuration which corresponds to the circular configuration of the disc. The cover is constructed of a material that will not adversely interfere with the read process of the disc when the cover is in place about the disc. The cover further comprises a plurality of resilient clasps spaced about a circumferential edge of the film to engage the disc about its outer edge in a snap-on spring-like fit. The apparatus has a base to hold the cover with the clasps in a closed position oriented upwardly away from the base, a moveable expanding means to urge the clasps from the closed position to an open, disc-receiving position, centering means to orient and hold the disc concentric with the cover and a top having an inside face and an outside face. The top comprises press means to exert a force on the disc in the direction of the cover, whereby the force urges the edge of the disc to co-operate with the expanding means to expand the clasps into the open disc-receiving position while urging the disc in position within the cover whereby the clasps return to the closed position thereby engaging the edge of the disc in the snap-on spring-like fit.

16 Claims, 3 Drawing Sheets

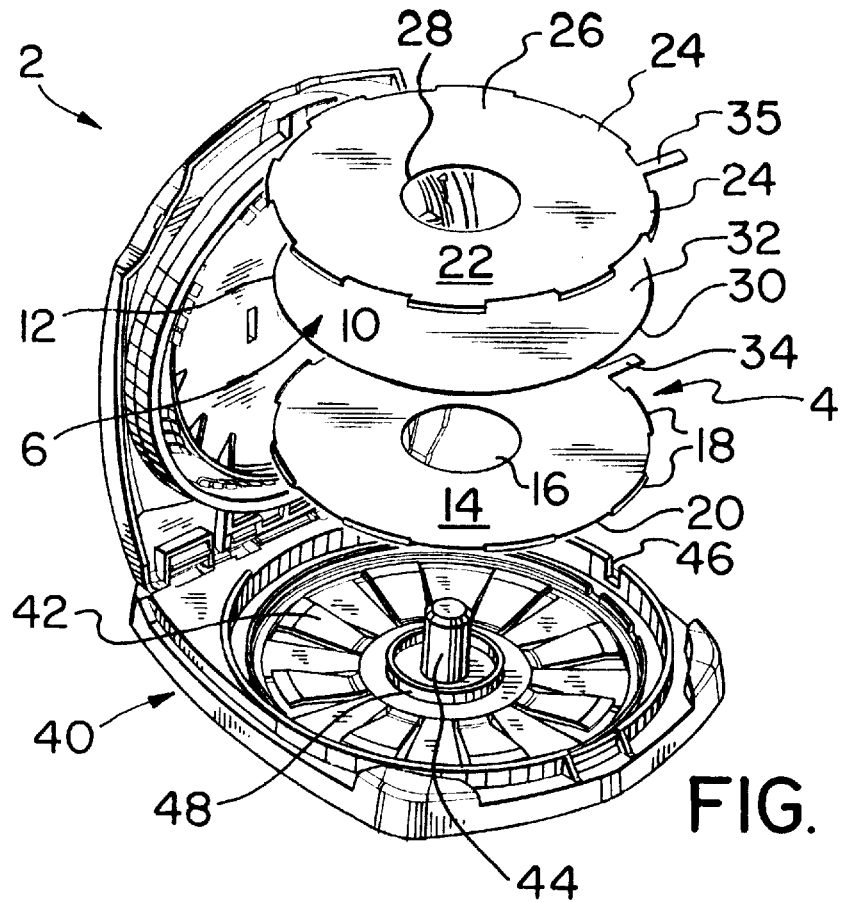
FIG. 1
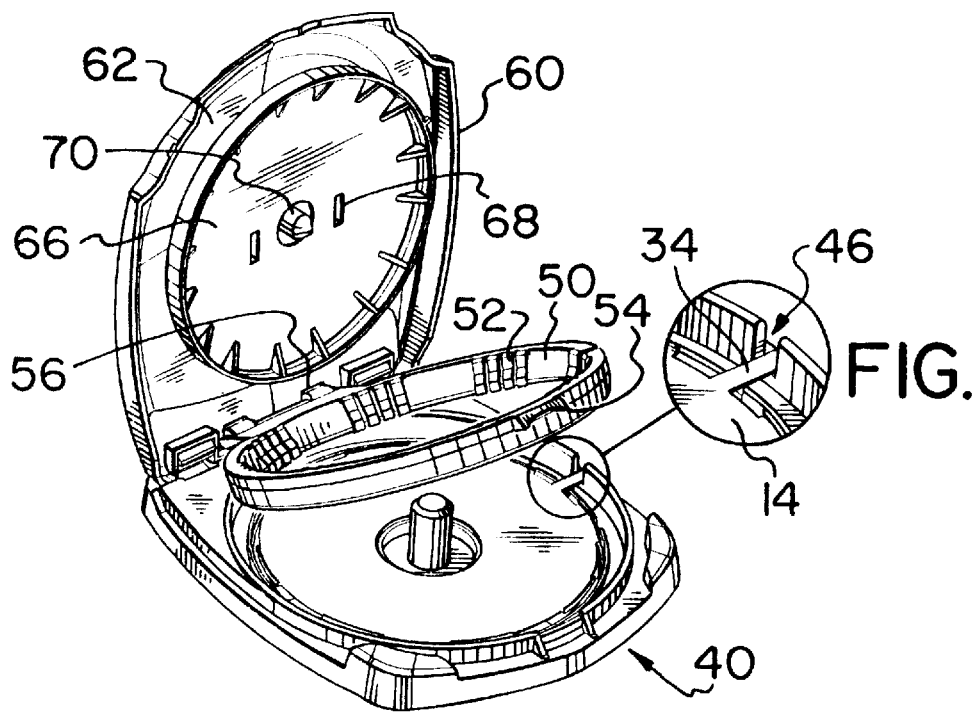
FIG. 2a
FIG. 2

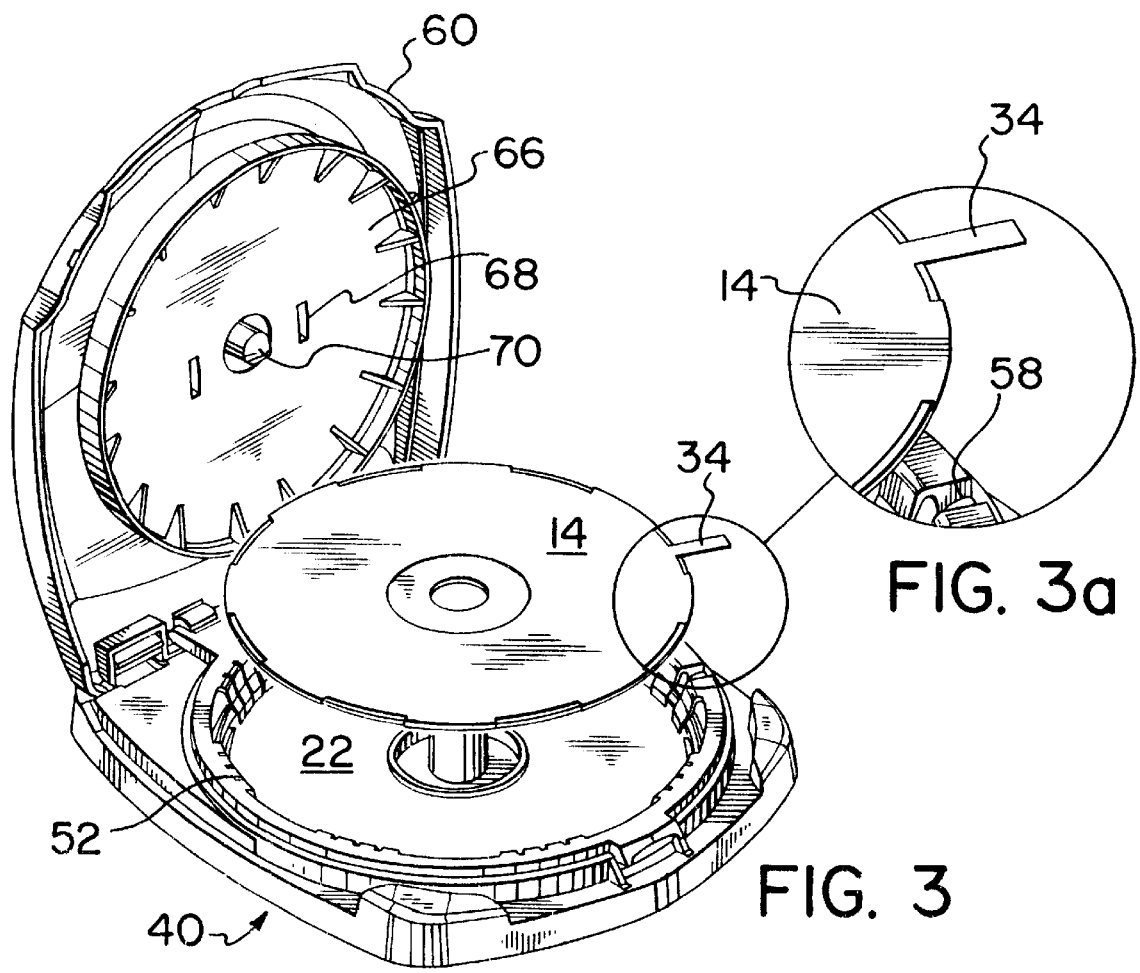
FIG. 3a
FIG. 3
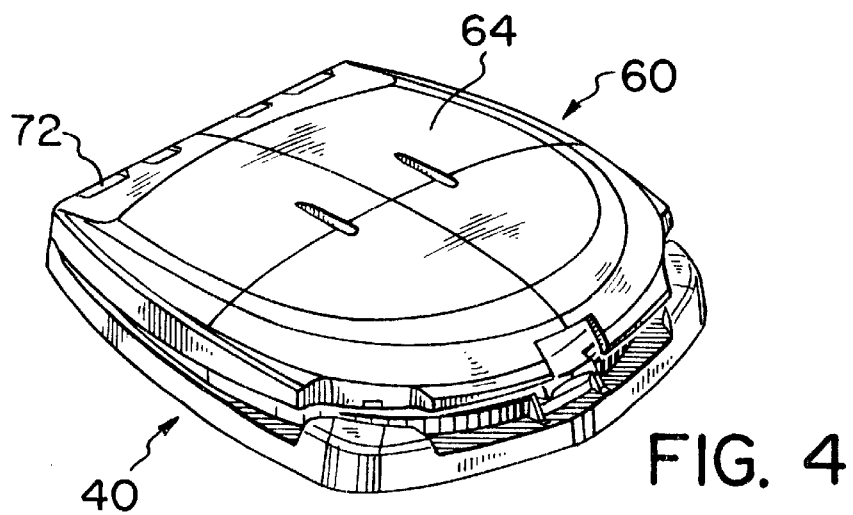
FIG. 4

APPLICATOR FOR PROTECTIVE COVER FOR AN OPTICAL DISC

REFERENCE TO RELATED CASES

This application is a continuation-in-part of U.S. patent application Ser. No. 08/713,523 filed Sep. 13, 1996, entitled "Protective Cover For An Optical Disc" now U.S. Pat. No. 5,787,069 by the same inventor herein.

FIELD OF THE INVENTION

This invention relates to an apparatus for applying a removable protective cover to an optical disc.

BACKGROUND OF THE INVENTION

The presence of optical discs in entertainment and business applications is ever-increasing in today's high-tech marketplace. Optical discs offer a compact, efficient and cost-effective means of storing data and transmitting that stored data on request. Indeed, optical discs are the fastest growing form of digital data storage in the world today. Such common applications include compact discs (CD's) for music, CD ROM's for computer programs and information retrieval, such as encyclopedias and digital versatile discs (DVD's) for audio-visual entertainment as well as recording purposes.

An optical disc is comprised of a number of discrete layers. The data layer will store the data in the form of a number of microscopic pits to be read by the laser of the optical disc reader. That data layer is enclosed within a series of protective layers, top and bottom. The bottom layers, commonly referred to as the "read-side" of the disc are transparent substrates which allow the laser to pass through to read the data. Scratches to this read-side surface may affect the laser beam path, however, the manner in which data is stored on an optical disc allows for an amount of read-side imperfections without preventing the playing device from reading the disc. Nonetheless, the thickness of the read-side layer of the disc is typically in the order of 1.2 mm and this portion comprises the bulk of a conventional CD, for example.

On the top side of the disc, there is a reflective layer which is in turn protected by a discrete protective layer and a graphical layer, which normally supports the label and information pertaining to the product of the disc. The reflective layer is crucial to the successful use of an optical disc in that it reflects the data enriched laser beam to the playing device receiver where the data is read and interpreted for the user. Any breach or damage to this layer will result in the laser beam passing directly through the disc at the point of the breach or damage, thereby losing the data stored at that point. Notwithstanding the importance of maintaining the integrity of this layer, the combined thickness of the layers which comprise the top-half of a conventional CD is typically in the order of 0.3 mm (one-quarter the thickness of the read-side layers).

There is thus a need in the industry to provide additional protection of the top side of the disc, in addition to the read-side. This protection to both sides of the disc must not adversely interfere with the operation of the disc, yet it should be capable of being user-installed and should be configured so as to completely cover the disc. Reference may be had to applicant's co-pending U.S. application, Ser. No. 08/713,523 now U.S. Pat. No. 5,787,069 which describes a protective cover for an optical disc which does not adversely affect the read process of the disc. The cover completely encapsulates the disc in a snap fit protecting the disc from scratches and debris while allowing the data stored on the disc to be read by conventional optical readers.

With the protective cover, there comes a need for an easy to use apparatus for applying the cover to the disc. The apparatus should be sufficiently easy for a customer to use so that covers can be applied in a foolproof manner to discs already in the possession of the customer and also of a type which could be used by distributors which may wish to cover the disc prior to sale to the customer. Any such apparatus should ensure that the disc is completely covered in a manner which will protect the disc from scratches, debris and the like, but which will not adversely interfere with the read process of the disc.

SUMMARY OF THE INVENTION

It is thus an object of the present invention to provide an apparatus for applying a removable protective cover to an optical disc.

In one aspect of the invention, there is provided an apparatus for applying a removable protective cover to an optical disc in which the optical disc has a circular configuration, an aperture centered therein and an outer edge. The cover comprises at least one sheet of film of generally circular configuration which corresponds to the circular configuration of the disc. The cover is constructed of a material that will not adversely interfere with the read process of the disc when the cover is in place about the disc. The cover further comprises a plurality of resilient clasps spaced about a circumferential edge of the film to engage the disc about its outer edge in a snap-on spring-like fit. The apparatus comprises a base to hold the cover with the clasps in a closed position oriented upwardly away from the base, a moveable expanding means to urge the clasps from the closed position to an open, disc-receiving position, centering means to orient and hold the disc concentric with the cover and a top having an inside face and an outside face. The top comprises press means a to exert a force on the disc in the direction of the cover, whereby the force urges the edge of the disc to co-operate with the expanding means to expand the clasps into the open disc-receiving position while urging the disc in position within the cover whereby the clasps return to the closed position thereby engaging the edge of the disc in the snap-on spring-like fit.

In another aspect of the invention, there is provided resilient biasing means in the base to permit the disc to move through the expanding means.

In another aspect of the invention, there is provided alignment means in the base to rotationally position the cover in a first orientation.

In another aspect of the invention, the expanding means comprises a spreader ring provided with a plurality of spaced apart resilient fingers.

In another aspect of the invention, the spreader ring further comprises alignment means to rotationally position a disc having a first sheet of the film on one side thereof in a second orientation.

In another aspect of the invention, the press means comprises a planar member pivotally connected to the top so that the planar member is free to move over a predetermined range of motion relative to the top in order to exert a uniform downward force on the disc.

BRIEF DESCRIPTION OF THE DRAWINGS

These and other advantages of the invention will become apparent upon reading the following detailed description and upon referring to the drawings in which:

FIG. 1 is a perspective view of the apparatus of the present invention in the open position, with a part of the cover in partially exploded view;

FIG. 2 is a perspective view of the apparatus of FIG. 1 with the part of the cover in position within the base;

FIG. 2a is a cut-away view of a portion of the cover within the base;

FIG. 3 is perspective view of the apparatus of the present invention with another part of the cover shown in partially exploded view;

FIG. 3a is a cut-away view of the other portion of the cover and the expanding means.

FIG. 4 is a perspective view of the apparatus of FIG. 1 in a closed position.

Figure 5A:
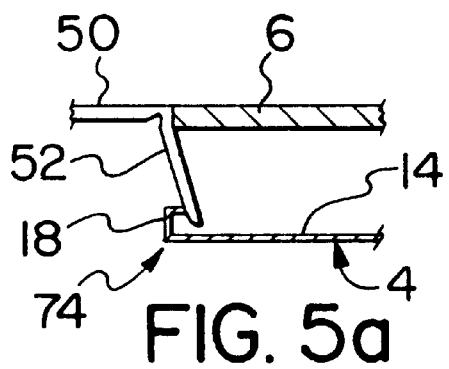
FIGS. 5a to 5d are detail views of the disc, expanding ring and clasps of the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates an apparatus 2 for applying a removable protective cover 4 to an optical disc 6. The optical disc 6 has a circular configuration with an aperture 10 centered in the disc 6 and an outer edge 12. The protective cover 4 comprises a first sheet of film 14 of generally circular configuration corresponding to the configuration of the disc 6, having an aperture 16 centered therein and made of a material that will not adversely interfere with the read process of the disc 6 when the cover 4 is in place about the disc 6. In use, the cover 4 does add to the bit error read rate at which a computer of CD audio drive reads. However, the redundancy at which the data is printed on the disc 6 and the error compensation systems built into the hardware more than compensate for extra error induced by the cover 4. Thus, there is no net effect on the read process. Preferably, the film used for the cover 4 will be transparent, semi-transparent or opaque. For optimum results, the material of the film should be chosen from plastics having a refractive index comparable to the refractive index of the protective layer of the disc 6. Plastics chosen from the group consisting of polyester and polycarbonate, such as polycarbonate sold under the trademark Lexan, are well-suited to the application of the present invention.

There is also provided a plurality of clasps 18 spaced about a circumferential edge 20 of the sheet 14 to engage the disc 6 about its outer edge 12 in a snap fit. The clasps 18 are preferably spaced over a portion of the circumferential edge 20. The thickness of the film is typically in the range of 0.001 and 0.02 inches and is preferably about 0.007 inches thick.

The protective cover 4 may also comprise a second sheet 22 of the film similar to the first sheet 14 and having a plurality of clasps 24 spaced about the circumferential edge 26 of the second sheet 22 and an aperture 28 centered therein. In this embodiment, the sheets 14, 22 engage opposite faces 30, 32 respectively of the disc 6, such that the clasps 18 of sheet 14 are alternating and offset relative to the clasps 24 of the second sheet 22 about the outer edge 12 of the disc 6. This thus enables a complete, single layer encasement of the disc 6, both top and bottom, and around the outer edge 12.

The first 14 and second 22 sheets of film may also be provided with removable tabs 34 and 35 respectively to assist in the alignment of the sheets of film within the apparatus 2 in a manner to be described below.

The apparatus 2 comprises a base 40 to hold the cover 4 in place with the clasps 18 in closed position oriented upwardly away from the base 40. There may be provided resilient members, such as springs 42, within the base 40 to permit the disc 6 to move beyond through the expanding means provided in the apparatus 2 to expand the clasps 18 of the cover 4. The base 40 may also comprise a centering post 44 to align the cover 4 and the disc 6 concentrically and alignment means, shown in the form of slot 46 to cooperate with tabs 34 and 35 of cover 4 to align the cover 4 within the base 40. Centering ring 48 may also be provided to assist in the concentric alignment of the cover 4 and the disc 6.

The expanding means is preferably in the form of an expanding or spreader ring 50 comprised of a series of resilient fingers 52 grouped together in a configuration to match the configuration of the clasps 18 and 24 on sheets 14 and 22 respectively. The spreader ring 50 is provided with a lifter tab 54 and is hinged to the base 40 at 56 so that the spreader ring 50 is moveable within the apparatus 2 from a fully non-engaging position (shown in FIG. 1) to a fully engaged position (not shown) in which it engages the sheet of film within the base 40.

As best seen in FIG. 3a, the spreader ring 50 is provided with an alignment notch 58 which will permit the offset alignment of the clasps 18 of the first sheet 14 of film secured to the first face 30 of the disc 6 relative to the clasps 24 of the second sheet 22 which is to be secured to the second face 32 of the disc 6.

The top 60 of the apparatus 2 has an inside face 62 and an outside 64 face. There is provided a planar member 66 which functions as a press means to exert a downward force on the disc 6 to urge it into place within the cover 4 during the application as described below. It is preferable for the efficient attachment of the cover 4 to the disc 6 to have the downward force exerted on the disc 6 to be in as uniform a direction as possible. Therefore, the planar member 66 is pivotally connected to the inside face 62 of the top 60 by pivotal connection means 68. This permits the planar member to pivot in the direction indicated and to slide back and forth on the pivotal connection means 68.

The inside face 62 of the top 60 is provided with a centering pin 70 which co-operates with post 44 to orient the planar member 66 concentric with the cover 4 and the disc 6 when in place within the base 40. The top 60 is hingedly connected to the base 40 at 72 to permit the top 60 to move upwardly and downwardly between the open position shown in FIGS. 1 to 3 and the closed position shown in FIG. 4.

In use, the first sheet 14 is placed in position by aligning the aperture 16 with the centering ring 48 and with the tab 34 sitting in the slot 46 (as shown in FIG. 2a), which will orient the sheet 14 in position such that the clasps 18 will mate and co-operate with the fingers 52 of the spreader ring 50. The spreader ring 50 is lowered on top of the first sheet 14 so that the fingers 52 are positioned inside the clasps 18, without exerting any pressure on the clasps 18. A disc 6 is then placed in the base 40 by aligning the center aperture 10 with the post 44. The top 60 is then lowered to its closed position (FIG. 4) such that the planar member 66 is pressing downwards on the disc 6 to push the disc 6 through the spreader ring 50 and perfectly align the disc 6 within the clasps 18 of the sheet 14.

Figure 5C:
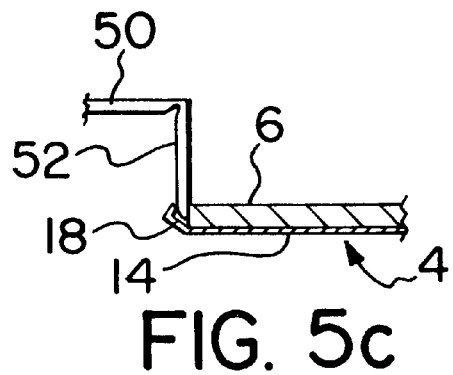
Figure 5B:
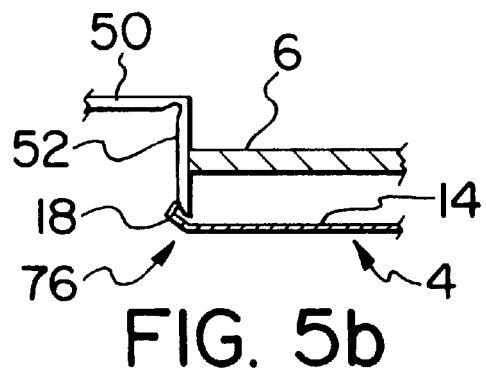
Figure 5D:
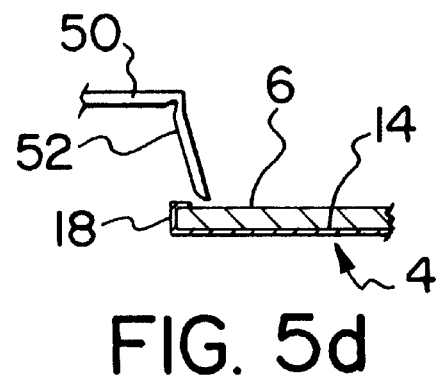

Referring to the series of drawings in FIGS. 5a to 5d, the resilient fingers 52 of the spreader ring 50 meet with the clasps 18 in their closed position 74. As the planar member 66 presses upon the disc 6 in the direction of the base 40, the disc 6 passes through the expanding ring 50 such that the fingers 52 push the clasps 18 into their open position 76. In the open position 76, the diameter of the sheet 14 defined by the clasps 18 is greater than the outside diameter of the disc 6 as defined by the outer edge 12. This allows the disc 6 to be pressed down below the level of the spreader ring 50, by compressing the springs 42 in the base 40. Thus, the disc 6 is free of the spreader ring 50. The top 60 can now be opened, the spreader ring lifted and the disc 6 removed with the first face 30 completely covered by first sheet 14.

In order to attach the second sheet 22 to face 32 of disc 6, place the second sheet 22 in the base 40 with the aperture 28 aligned with the centering ring 48 and the tab 35 aligned with the slot 46. The spreader ring 50 is then lowered into position adjacent the second sheet 22. The disc 6, with first sheet 14 attached is then positioned in base 40 by means of the post 44 and the notch 58. The tab 34 of first sheet 14 is aligned with notch 58 (as shown in FIG. 3a) so that the clasps 18 of the first sheet 14 will be alternating and offset relative to clasps 24 of second sheet 22. The top 60 is then lowered into the closed position and, in the same manner as explained above, the planar member 66 pushes the disc 6 through the spreader ring 50 into position within the clasps 24 of sheet 22. Because of the offset orientation of clasps 18 relative to clasps 24, the fingers 52 will not impact or contact the clasps 18 of the first sheet 14 already in place on the disc 6. Thus, when the top 60 is lifted to its open position, the disc 6 can be removed completely encapsulated within protective cover 4. Once the tabs 34 and 35 are removed, the clasps 18 and 24 are left engaging the outer edge 12 of the disc 6 in a snap-on, spring-like fit.

Thus, it is apparent that there has been provided in accordance with the invention an apparatus for applying a protective removable cover to an optical disc that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

We claim:

1. An apparatus for applying a removable protective cover to an optical disc, said optical disc having a circular configuration, an aperture centered therein and an outer edge, wherein said cover comprises at least one sheet of film of generally circular configuration corresponding to said circular configuration of said disc and being constructed of a material that will not adversely interfere with the read process of said disc when said cover is in place about said disc and a plurality of resilient clasps spaced about a circumferential edge of said film to engage said disc about said outer edge in a snap-on spring-like fit, said apparatus comprising:

a base to hold said cover with said clasps in a closed position oriented upwardly away from said base;

a moveable expanding means to urge said clasps from said closed position to an open, disc-receiving position;

centering means to orient and hold said disc concentric with said cover; and a top having an inside face and an outside face, said top comprising press means to exert a force on said disc in the direction of said cover, whereby said force urges said outer edge of said disc to co-operate with said expanding means to expand said clasps into said open disc-receiving position while urging said disc in position within said cover whereby said clasps return to said closed position thereby engaging said outer edge of said disc in said snap-on spring-like fit.

2. The apparatus of claim 1 wherein said base further comprises resilient biasing means to permit said disc to move through said expanding means.

3. The apparatus of claim 2 wherein said resilient biasing means comprises a plurality of spaced apart springs mounted in said base.

4. The apparatus of claim 1 wherein said centering means comprises a post extending upwardly in said base.

5. The apparatus of claim 4 further comprising a member extending outwardly from said inside face of said top to mateably engage with said post when said top is lowered to a position adjacent said base.

6. The apparatus of claim 1 further comprising alignment means in said base to co-operate with a removable tab extending radially outwardly from said to rotationally position said cover in a first orientation.

7. The apparatus of claim 3 wherein said alignment means comprises a slot in a side of said base.

8. The apparatus of claim 1 further comprising a centering ring in said base to assist in alignment of said disc relative to said cover.

9. The apparatus of claim 1 wherein said expanding means comprises a spreader ring having a plurality of spaced apart resilient fingers.

10. The apparatus of claim 9 wherein said spreader ring further comprises lifting means.

11. The apparatus of claim 9 wherein said spreader ring is hingedly connected to said base.

12. The apparatus of claim 9 wherein said spreader ring further comprises alignment means to rotationally position said disc having a first sheet of said film on one side thereof in a rotated orientation.

13. The apparatus of claim 1 wherein said top is hingedly connected to said base.

14. The apparatus of claim 1 wherein said press means comprises a planar member pivotally connected to said top so that said planar member is free to move over a predetermined range of motion relative to said top so that said planar member exerts said force in a uniform downward direction.

15. An apparatus for applying a removable protective cover to an optical disc, said optical disc having a circular configuration, an aperture centered therein and an outer edge, wherein said cover comprises a first and second sheet of film, each of generally circular configuration corresponding to said circular configuration of said disc and each of said first and second sheets of film being constructed of a material that will not adversely interfere with the read process of said disc when said cover is in place about said disc and a plurality of resilient clasps spaced about a circumferential edge of each of said first and second sheets of film to engage said disc about said outer edge in a snap-on spring-like fit and a respective removable tab extending radially outwardly from said circumferential edge of said first and second sheets of film, said apparatus comprising:

a base to hold said first and second sheets of film with said clasps in a closed position oriented upwardly away from said base, said base further comprising resilient, biasing means and alignment means to co-operate with said respective tabs to rotationally position one of said first and second sheets of film in a first orientation;

a moveable expanding means to urge said clasps from said closed position to an open, disc-receiving position, said expanding means comprising a spreader ring hingedly connected to said base and having a plurality of spaced apart resilient fingers and alignment means to rotationally position said disc having said one of said first and second sheets of film on one side thereof in a second orientation;

centering means comprising a post in said base to orient and hold said disc concentric with said cover; and a top, hingedly connected to said base and having an inside face and an outside face, said top comprising a member extending outwardly from said inside face of said top to mateably engage with said post when said top is lowered to a position adjacent said base and a planar member pivotally connected to said inside face of said top so that said planar member is free to move over a pre-determined range of motion relative to said top to exert a force on said disc in the direction of said cover, whereby said force urges said outer edge of said disc to cooperate with said expanding means to expand said clasps into said open disc-receiving position while urging said disc in position within said cover whereby said clasps return to said closed position thereby engaging said outer edge of said disc in said snap-on spring-like fit.

16. A method of applying a protective cover to an optical disc with the use of an applicator means, said optical disc of circular configuration having a circular aperture centered therein and having an outer edge, said cover comprising a first and second sheet of film of generally circular configuration, each of said first and second sheets of film of a material that will not adversely interfere with the read process of said disc when said cover is in place about said disc, and a plurality of resilient clasps oriented on a circumferential edge of each of said first and second sheets of film, said applicator means comprising a base, a moveable expanding means, centering means, and a top comprising a press means; said method comprising the steps of:

positioning said first sheet of film in said base over said centering means with said clasps in a closed position oriented upwards relative to said base and in a first orientation;

lowering said expanding means to a position adjacent said first sheet of film;

placing said disc in said base on said centering means so as to be concentric with said first sheet of film;

moving said top towards said base wherein said press means exerts a downward force on said disc and said expanding means to expand said clasps to an open disc-receiving position until said disc passes through said expanding means at which point said clasps return to said closed position, thereby engaging said outer edge of said disc in said snap-on spring-like fit;

lifting said top;

removing said disc with said first sheet of film attached to one side of said disc;

positioning said second sheet of film in said base over said centering means with said clasps in a closed position oriented upwards relative to said base and in the first orientation;

lowering said expanding ring to a position adjacent said second sheet of film;

placing said disc in said base on said centering means so as to be concentric with said second sheet of film;

rotating said disc to a second orientation wherein the clasps of said first sheet of film are offset relative to the clasps of said second sheet of film;

moving said top towards said base wherein said press means exerts a downward force on said disc and said expanding means to expand said clasps of said second sheet of film to the open disc-receiving position until said disc passes through said expanding means at which point said clasps of said second sheet of film return to said closed position, thereby engaging said outer edge of said disc in said snap-on spring-like fit; and lifting said top and removing said disc having said first sheet film attached to the one side of said disc and said second sheet of film attached to the opposite side of said disc.

* * * * *